J. L. BISHOP.
SCISSORS.
APPLICATION FILED JULY 22, 1908.
929,749.
Patented Aug. 3, 1909.
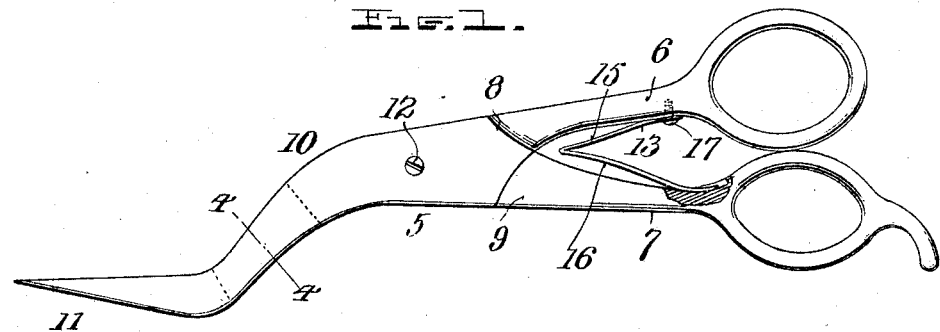
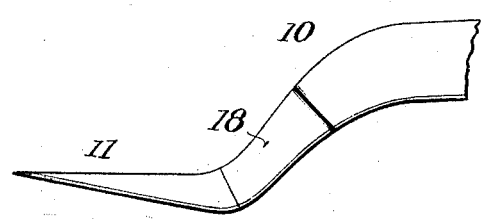
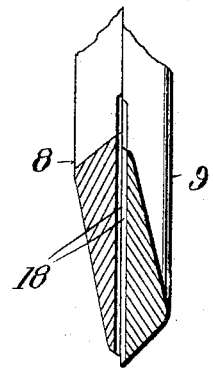
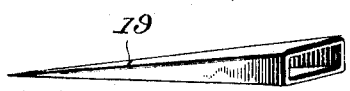
Inventor
John L. Bishop
Witnesses
By
Attorneys

UNITED STATES PATENT OFFICE.

JOHN LORENZO BISHOP, OF DORCHESTER, MASSACHUSETTS.

SCISSORS.

No. 929,749.      Specification of Letters Patent.      Patented Aug. 3, 1909.

Application filed July 22, 1908. Serial No. 444,803.

*To all whom it may concern:*

Be it known that I, JOHN LORENZO BISHOP, a citizen of the United States, residing at Dorchester, in the county of Suffolk, State of Massachusetts, have invented certain new and useful Improvements in Scissors; and I do hereby declare the following to be a full, clear, and exact description of the invention, such as will enable others skilled in the art to which it appertains to make and use the same.

The invention relates to scissors or shears and more particularly to the class of barbers' shears.

The primary object of the invention is the provision of shears having offset cutting blades, whereby an operator can cut the outline of the hair around the ears of the person more readily and quickly and with less danger of clipping or cutting the ears for the reason that the offset blades will lie close to the head of the person when the shears are being manipulated for cutting the hair.

Another object of the invention is the provision of shears having offset cutting portions at one end thereof and a tension means for initially opening the blades of the shears.

With these and other objects in view the invention for example consists in the construction, combination and arrangement of parts as will be hereinafter more fully described and as illustrated in the accompanying drawings which disclose the preferred form of embodiment of the invention. It is to be understood however, that changes, variations and modifications may be resorted to without departing from the spirit of the invention and as come properly within the scope of the claims hereunto appended.

In the drawings: Figure 1 is a side view of the shears constructed in accordance with the invention. Fig. 2 is a plan view of part of one of the blades. Fig. 3 is a fragmentary plan view looking toward the inner face of one of the blades. Fig. 4 is a transverse sectional view on the line 4—4 of Fig. 1. Fig. 5 is a perspective view in detail of a removable cap for the blade extremities.

Similar reference characters indicate corresponding parts throughout the several views in the drawings.

In the drawings the numeral 5 designates generally the shears comprising handles 6 and 7 projecting from adjacent members 8 and 9 which latter are correspondingly curved downwardly as at 10 to form offset cutting blades 11 and which members are connected together by a pivot bolt 12 which is screwed into the same and preferably at its ends slightly riveted or otherwise held from turning.

Between the handles 6 and 7 is mounted a flat tension spring 13 the latter bent on itself to form curved outwardly diverging yieldable portions 15 and 16, the said portion 15 is connected to the handle 6 by a screw or rivet 17 and the portion 16 freely engages and slides in a groove or guideway formed in the other handle 7 of the members. It is obvious that the yieldable portions 15 and 16 serve to spread the members apart to initially open the pair of shears. A tapering cap preferably formed of leather however, it may be of any other suitable material, is designated by the numeral 19 and which cap is adapted to be inserted over the offset cutting blades 11 to protect the same when the shears are not in use.

The downwardly curved portions 10 of the members 8 and 9 are cut away in their inner faces as at 18 to form a space therebetween, to prevent the hair of a person operated upon from being pulled in event the hair should be forced between the members beyond the cutter blade.

What is claimed is—

1. A pair of shears comprising pivoted members having handles at one end thereof, each of said members being formed with a downward curvature near the end opposite its handle, and forwardly projecting cutting extremities beyond said curvature, said members having registering recesses on opposite inner faces thereof at the location of the curvature.

2. A pair of shears comprising pivoted members having handles at one end thereof, each of said members being formed with a downward curvature near the end opposite its handle, forwardly projecting cutting extremities beyond said curvature, said members having registering recesses on opposite inner faces thereof at the location of the curvature, and a spring member carried by one of the members and acting on the other of said members to initially open the members.

3. A pair of shears comprising pivoted members having handles at one end thereof, each of said members being formed with a downward curvature near the end opposite its handle, forwardly projecting cutting extremities beyond said curvature, said members having registering recesses on opposite inner faces thereof at the location of the curvature, a spring member carried by one of the members and acting on the other of said members to initially open the members and a cap detachably fitted over said cutting extremities to maintain the said members in a closed position.

In testimony whereof, I affix my signature, in presence of two witnesses.

JOHN LORENZO BISHOP.

Witnesses:
 THOMAS C. MURPHY,
 HARRIS GRUBER.